United States Patent [19]
Baum et al.

[11] Patent Number: 6,148,207
[45] Date of Patent: Nov. 14, 2000

[54] OPTIMIZATION OF FER SETTINGS DURING SOFT HANDOFF

[75] Inventors: Modris Olgerts Allen Baum, Rockaway; Edward Fredrick Berliner, Randolph; Roy Herbert Durdik, Morris Plains; Eshwar Pittampalli, Randolph, all of N.J.

[73] Assignee: Lucent Technologies Inc., Murray Hill, N.J.

[21] Appl. No.: 09/019,266

[22] Filed: Feb. 5, 1998

[51] Int. Cl.[7] ........................... H04Q 7/20
[52] U.S. Cl. ................. 455/442; 455/438; 455/439; 370/332
[58] Field of Search ............... 455/442, 439, 455/438, 437, 436; 370/331, 332

[56] References Cited

U.S. PATENT DOCUMENTS

| 5,345,448 | 9/1994 | Keskitalo | 455/439 |
| 5,454,026 | 9/1995 | Tanaka | 455/437 |
| 5,682,416 | 10/1997 | Schmidt et al. | 455/436 |
| 5,754,945 | 5/1998 | Lin et al. | 455/436 |
| 5,771,451 | 6/1998 | Takai et al. | 455/442 |
| 5,864,760 | 1/1999 | Gilhousen et al. | 455/442 |
| 5,878,350 | 3/1999 | Nakamura et al. | 455/442 |
| 5,884,177 | 3/1999 | Hanley | 455/439 |
| 5,884,187 | 3/1999 | Ziv et al. | 455/522 |
| 5,893,035 | 4/1999 | Chen | 455/522 |
| 5,913,167 | 6/1999 | Bonta et al. | 455/438 |
| 5,940,762 | 8/1999 | Lee et al. | 455/442 |
| 5,949,773 | 9/1999 | Bhalla et al. | 455/439 |

FOREIGN PATENT DOCUMENTS

| 0822672 | 2/1998 | European Pat. Off. |
| 9734439 | 9/1997 | WIPO |

*Primary Examiner*—Nguyen Vo
*Assistant Examiner*—Eliseo Ramos-Feliciano

[57] ABSTRACT

The performance of a wireless telecommunications system is enhanced by the exchange of frame error rate (FER) setting data between base stations and an FER control system within a selection/distribution unit. This exchange occurs when radio facilities from other base stations are added to a call during a soft handoff procedure.

9 Claims, 3 Drawing Sheets

OPTIMIZATION OF FER SETTINGS DURING SOFT HANDOFF

CROSS REFERENCE TO RELATED APPLICATION

This application is related to application Ser. No. 09/019,267 of. Modris O. A. Baum, Eshwar Pittampalli and Carl F. Weaver entitled "Method For Optimizing Forward Link Power Levels During Soft Handoffs In A Wireless Telecommunications Network", which application is filed concurrently herewith on Feb. 5, 1998 is assigned to the assignee of the present application.

TECHNICAL FIELD

This invention relates to wireless telecommunications networks, and more particularly, to enhancing the compatibility and performance of such networks during soft handoff procedures.

BACKGROUND OF THE INVENTION

The world-wide proliferation of wireless telecommunications technology presents an opportunity for service providers to profit from an ever-growing demand for convenient, reliable wireless service. As these service providers are well aware, controlling expenses while providing such service poses a significant challenge. Existing wireless service providers meet this challenge by implementing wireless telecommunications networks comprised of mobile switching centers (MSCs) interconnected to base stations. The MSC completes calls between mobile terminals (that is, any mobile station which uses radio transmission) and other parties. These "other parties" may be other mobile terminals or subscribers served by the public-switched telephone network (PSTN). Each base station is associated with a specific geographic region and is an interface between mobile terminals within its region and the MSC.

One consequence of the explosive growth of wireless telecommunications and the emergence of numerous service providers is the deployment of diverse, wireless telecommunications networks. The variety of systems and protocols used by these networks is the cause of complex incompatibility issue which affect performance. More particularly, the incompatibility of existing wireless systems results in the inability to reconcile frame error rates (FER) of multiple base stations serving the same call during a soft handoff situation. This is because wireless service providers set the FER at each base station in accordance with subscriber requirements based on the characteristics of the geographic area in which it is located. For example, base stations in premium service areas (e.g., urban regions and airports) usually have more stringent FER requirements than those in less populated areas. These stricter FER requirements ensure a level of network performance to which the subscriber in the geographic region are accustomed. Alternatively, service providers may choose to provide a lower level of service to achieve greater capacity in areas of high use.

All base stations serving a call should maintain the same FER settings to ensure high quality and power efficient transmissions. It is well known that the FER setting may be enhanced by increasing signal power from the base station to the mobile terminal. Accordingly, if multiple base stations serving the same call operate at different FER settings, it is common for base stations which do not have the strongest radio link with the mobile terminal (i.e., the nondominant base stations) to increase power to the signal (i.e., the forward link gain) transmitted to the mobile terminal for maintaining predetermined FER requirements. The increase in forward link gain is an attempt, on the part of these nondominant base stations, to achieve the FER of base stations with strong radio links to the mobile terminal participating in the call. These increases in forward link gain by nondominant base stations in a soft handoff scenario do not appreciably enhance the transmission quality of the ongoing call. Indeed, such amplification of forward link gain adversely affect the quality of other calls served by nondominant base stations. Unfortunately, current implementations of wireless technology do not address the problem associated with differing FER settings of multiple base stations participating in a soft handoff scenario.

Therefore, there is a need in the art for reconciling FERs among base stations in a wireless telecommunications network.

SUMMARY OF THE INVENTION

This need is addressed and a technological advance is achieved in the wireless telecommunications art by enabling multiple base stations participating in a call to communicate and agree upon an FER setting for controlling the performance and quality of a call in soft handoff.

In the preferred embodiment, a wireless telecommunications system includes an MSC with a selection/distribution unit (SDU). The SDU includes an FER controller with a control algorithm for maintaining a uniform FER setting for all base stations participating in a call. More particularly, messaging between base stations via the SDU allows the FER controller to negotiate and control the FER setting for all base stations participating in a soft handoff scenario. Advantageously, increases in forward link gain by nondominant base stations are eliminated. Further, performance is enhanced by adjusting FER settings to an appropriate level for soft handoff performing base stations as a call traverses various geographic regions.

DETAILED DESCRIPTION

Figure 1A:
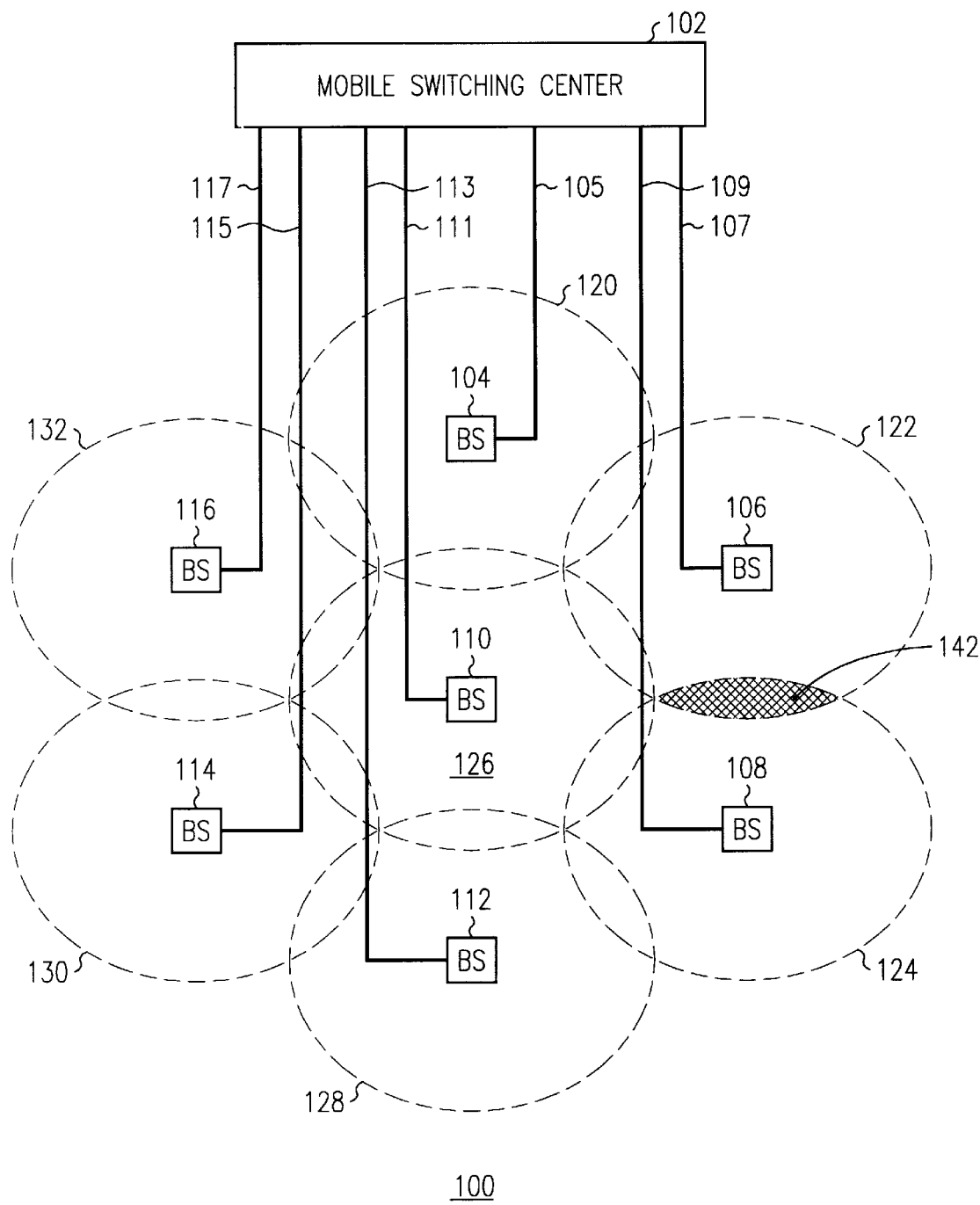
FIG. 1A is an illustrative embodiment of a wireless telecommunications system in which the present invention may be practiced.

FIG. 1A shows wireless telecommunications system 100 including mobile switching center (MSC) 102 and a plurality of base stations interconnected to the mobile switching center. More particularly, base stations 104, 106, 108, 110, 112, 114 and 116 are interconnected to MSC 102 via interconnection trunks 105, 107, 109, 111, 113, 115 and 117, respectively. Each interconnection trunk 105, 107. . . 117 includes three separate communication links between each base station and MSC 102. These links are described in detail in FIG. 1B. Wireless telecommunications system 100 is a CDMA system in which multiple base stations may serve a single mobile terminal. In this regard, MSC 102 allocates and monitors base station resources and facilitates relevant information exchange during a mobile call for maintaining system performance.

In wireless telecommunications system 100, each base station is associated with a particular geographic region. In a vast area of this region, it is assumed that the base station acts as the "dominant base station" (that is, the base station with the strongest radio link to an active mobile terminal). Although a dominant base station is identified, multiple base stations may serve the mobile terminal along geographic region border. In this example, base station 104 is the dominant base station associated with geographic region 120, base station 106 is the dominant base station for geographic region 122, base station 108 dominates geographic region 124, base station 110 is associated with geographic region 126, base station 112 is the dominant base station associated with geographic region 128, base station 114 is associated with geographic region 130, and base station 116 is the dominant base station associated with geographic region 132. Also shown in FIG. 1A are locations in which the geographic regions of each base station overlap. One such location is identified as intersecting region 142. In intersecting region 142, a mobile terminal may be served by base station 106, base station 108, base station 110 or some combination thereof. Although multiple base stations may serve a mobile terminal, there is generally one base station which maintains a dominant forward link with the mobile station during an active call. There are, however, times when multiple base stations may have essentially equal forward links to the mobile terminal.

MSC 102 determines the allocation of base station resources to any particular mobile station and addresses all system requests. For example, a mobile station traveling in an overlap geographic region, such as intersecting region 142, may request a soft handoff with another base station. The handoff request is triggered by a base station when the power level between the mobile terminal and another base station increases above a predetermined threshold level. In the preferred embodiment, during soft handoff procedure, the MSC 102 reconciles different operating parameters of base stations involved in a soft handoff procedure. One such operating parameter is the FER setting of each base station participating in the call.

Figure 1B:
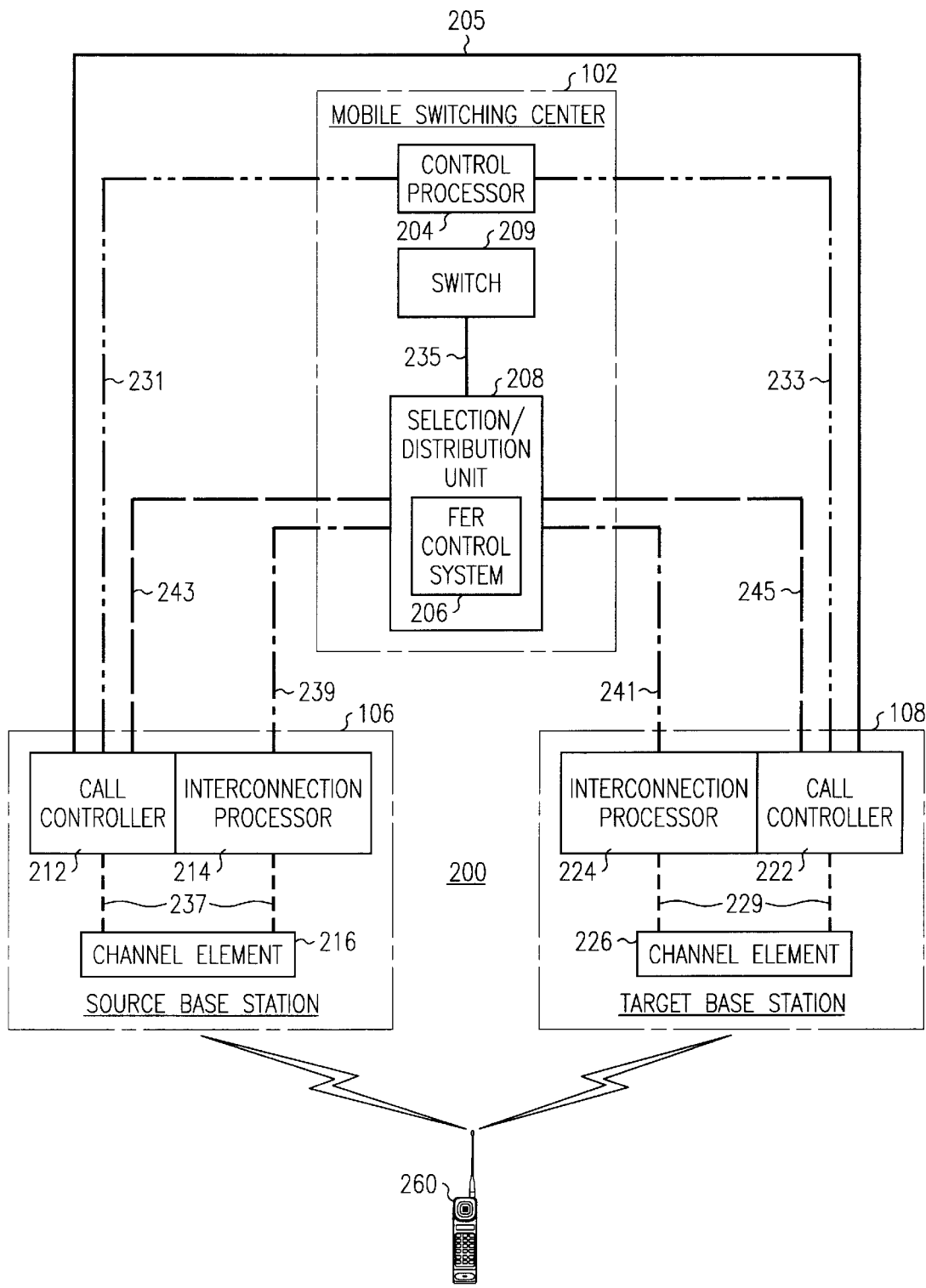
FIG. 1B is a simplified block diagram of the mobile switching center and two base stations shown in FIG. 1A.

FIG. 1B is a simplified block diagram of MSC 102 and its interconnections with base stations 106 and 108. The system architecture shown in FIG. 1B is described in more detail in the patent application of Michael F. Dolan, Thomas L. McRoberts, Eshwar Pittampalli and Thomas T. Towle entitled "Wireless Telecommunications System For Improving Performance And Compatibility", Ser. No. 08/881192, which is incorporated by reference herein. In this embodiment, MSC 102 comprises control processor 204, switch fabric 209 and SDU 208 including FER control system 206. Switch fabric 209 is interconnected to SDU 208 via link 235.

Base station 106 includes call controller 212, interconnection processor 214 and channel element 216. Channel element 216 is interconnected to the call controller and interconnection processor via links 237. Also shown is base station 108 including interconnection processor 224 and call controller 222 which are interconnected to channel element 226 via links 229. In this embodiment, mobile station 260 is being simultaneously served by base stations 106 and 108

Base stations 106 and 108 maintain established interconnection links to MSC 102. More particularly SDU 208 is interconnected to call controller 212 and interconnection processor 214 of base station 106 via interconnection links 243 and 239, respectively. MSC control processor 204 is interconnected to call controller 212 of base station 106 via interconnection link 231. Similarly, SDU 208 is interconnected to call controller 222 and interconnection processor 224 of base station 108 via interconnection links 245 and 241, respectively. Control processor 204 is interconnected to call controller 222 of base station 108 via interconnection link 233. In other words, each base station maintains three separate interconnection links to MSC 102. Further, call controller 212 of base station 106 and call controller 222 of base station 108 are interconnected via link 205.

FER control system 206 is responsible for monitoring all FER settings of all base stations in wireless telecommunications system 100. More particularly, FER control system 206 receives FER setting data from base station interconnection processors 214 and 224. During a soft handoff procedure, a base station sends a handoff required request to MSC 102 so that the MSC can allocate resources at another base station. FER control system 206 determines a least restrictive FER setting for the call. If, for some reason one or both stations do not transmit FER data, MSC 102 applies a default FER setting which may be comfortably met by all base stations in the system. In this manner, FER control system 206 reconciles potentially incompatible FER requirements of base stations in handoff for a given call.

Figure 2:
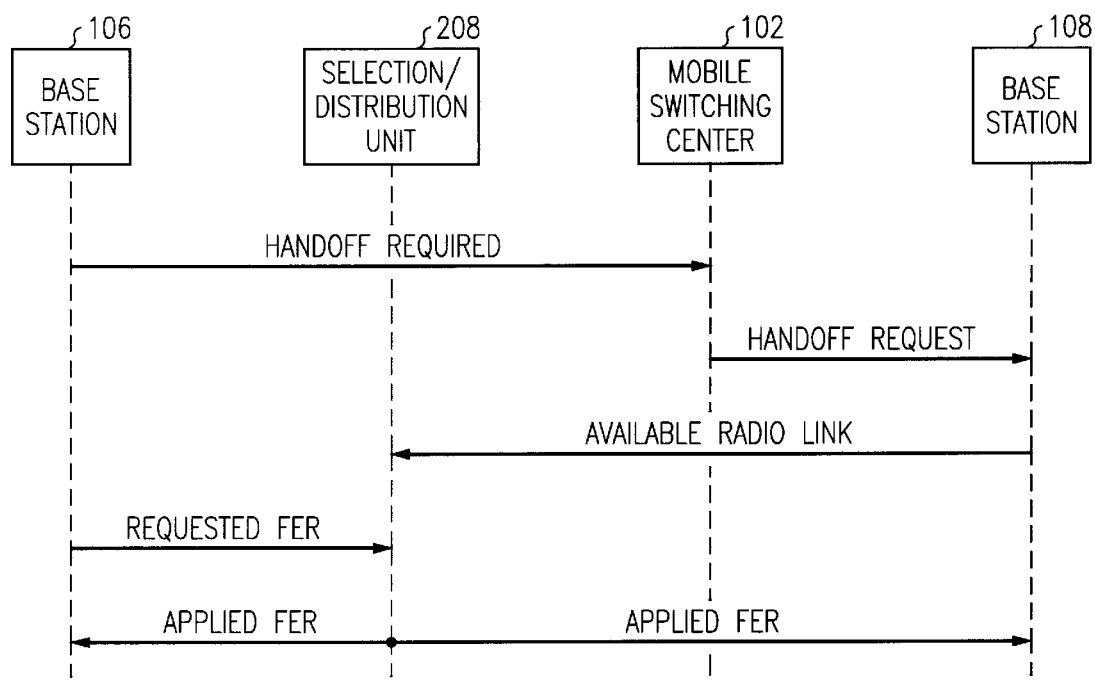
FIG. 2 is a message flow diagram depicting the exchange of messages occurring in the wireless telecommunications system of FIGS. 1A and 1B in accordance with the preferred embodiment of the present invention.

FIG. 2 is a message flow diagram illustrating the exchange of messages in wireless telecommunications system 100 during a soft handoff procedure in accordance with the preferred embodiment of the present invention.

For purposes of example, assume that mobile terminal 260 is located in intersecting region 142 where it is being simultaneously served by base stations 106 and 108. In alternative embodiments, more than two base stations may serve a mobile terminal in an intersecting region and the base stations may be associated with different MSCs. The soft handoff procedure begins when base station 106 extends a handoff required message to MSC 102. MSC 102 receives the handoff required message and subsequently extends a soft handoff request message to base station 108.

In response to the handoff request message, base station 108 extends a resource availability message to SDU 208 of MSC 102. The resource availability message identifies the radio link base station 108 will allocate to the call and includes the expected FER setting of the call. In this embodiment, base station 106 extends a requested FER setting which may or may not reflect the current FER applied to the call by the base station. All received FER data is extended to FER control system 206 which determines an FER that can be applied to the call. In most instances, the FER setting determined by FER control system 206 corresponds to the least restrictive FER setting for the call based on data received from all base stations involved in the call. The FER setting is then reported by SDU 208 to all participating base stations as the FER setting to be applied to the call. The application of the FER setting may take place prior to or in parallel to establishing a soft handoff call.

In this manner, attempts by one base station to match the FER setting of other base stations by increasing forward link gains are eliminated. More particularly, the SDU in an MSC coordinating a soft handoff procedure determines a FER setting which is acceptable to all base stations involved in the soft handoff process. Advantageously, unnecessary increases in power levels to the forward link are avoided so that base stations in a wireless telecommunications network may efficiently use resources.

Although the present invention has been described with respect to an illustrative embodiment, those skilled in the art will recognize that numerous other arrangements may be devised without departing from the scope of the invention.

What is claimed is:

1. In a wireless telecommunications system including a mobile switching center with a selection/distribution unit (SDU), a method for reconciling frame error rates among base stations comprises:

receiving in the SDU a frame error rate (FER) setting a threshold at or above which a FER for a call is maintained, from a first base station;

receiving in the SDU a FER setting from a second base station;

determining a least restrictive FER setting; and applying the least restrictive FER setting to a call.

2. The method of claim 1 further comprising the SDU applying the least restrictive FER setting to a call undergoing a soft handoff procedure.

3. The method of claim 1 wherein the step of receiving in the SDU a requested FER setting comprises:

receiving a requested FER setting in a FER setting control system.

4. The method of claim 1 further comprising the SDU extending an applied FER setting message to all base stations participating in a soft handoff call.

5. A wireless telecommunications system, comprising:

a controller receiving a FER setting from each base station involved in a soft handoff procedure for a given call, said FER setting for a base station being a threshold at or above which a FER for a call is maintained, and said controller determining a least restrictive FER setting from among the received FER settings as a desired FER setting for the given call.

6. The wireless telecommunications system of claim 5 further comprising a FER setting algorithm stored in the controller for applying a default FER setting to the call when no FER settings are received from the base stations.

7. The wireless telecommunication system of claim 5, wherein the controller instructs the base stations to apply the determined FER to the given call.

8. A method of establishing a frame error rate (FER) setting for base stations during a soft handoff procedure, comprising:

receiving a FER setting from each base station involved in a soft handoff procedure for a given call, said FER setting for a base station being a threshold at or above which a FER for a call is maintained;

determining a least restrictive one of the received FER settings as a desired FER setting for the given call; and instructing each base station involved in the call handoff procedure for the given call to apply the desired FER setting to the given call.

9. The method of claim 8, wherein the determining step determines a default FER setting as the determined FER setting when no FER settings are received from the base stations involved in the call handoff procedure for the given call.

* * * * *